United States Patent [19]
Tolopka et al.

[11] Patent Number: 6,044,349
[45] Date of Patent: Mar. 28, 2000

[54] SECURE AND CONVENIENT INFORMATION STORAGE AND RETRIEVAL METHOD AND APPARATUS

[75] Inventors: Stephen J. Tolopka, Portland; John J. Light, Hillsboro, both of Oreg.

[73] Assignee: Intel Corporation, Santa Clara, Calif.

[21] Appl. No.: 09/100,076

[22] Filed: Jun. 19, 1998

[51] Int. Cl.[7] .................................................. G06F 11/00
[52] U.S. Cl. ................................. 705/1; 380/4; 380/23; 380/25; 380/49
[58] Field of Search ................................. 705/1; 380/4, 8, 380/9, 25, 49, 3, 30, 23, 24, 50

[56] References Cited

U.S. PATENT DOCUMENTS

| | | | |
|---|---|---|---|
| 5,193,114 | 3/1993 | Moseley | 380/23 |
| 5,604,801 | 2/1997 | Dolan et al. | 380/21 |
| 5,742,756 | 4/1998 | Dillaway et al. | 713/200 |
| 5,751,806 | 5/1998 | Ryan | 380/9 |
| 5,778,071 | 7/1998 | Caputo et al. | 380/25 |
| 5,778,072 | 7/1998 | Samar | 380/30 |
| 5,796,824 | 8/1998 | Hasebe | 380/4 |
| 5,809,140 | 9/1998 | Rubin et al. | 380/21 |
| 5,825,882 | 10/1998 | Kowalski et al. | 380/25 |
| 5,850,442 | 12/1998 | Muftic | 380/21 |
| 5,857,021 | 1/1999 | Kataoka et al. | 380/4 |
| 5,857,024 | 1/1999 | Nishino et al. | 380/25 |
| 5,892,900 | 4/1999 | Ginter et al. | 713/200 |

*Primary Examiner*—Kevin J. Teska
*Assistant Examiner*—Demetra Smith
*Attorney, Agent, or Firm*—Blakely, Sokoloff, Taylor & Zafman LLP

[57] ABSTRACT

A portable storage medium is used to store data and provide access to information from an information dissemination system (IDS). The storage medium can store one or more location/key pairs. Each of the location/key pairs designates a particular IDS location as well as an access key to the particular IDS location. The storage medium can also store a plurality of information units. The information units are categorized into levels of information categories with at least one information category per level and at least one information unit per information category. Levels of information categories can be individually accessed and categories of information units within levels can be selectively downloaded.

13 Claims, 6 Drawing Sheets

FIG. 2

| INFORMATION UNIT / INFORMATION CATEGORY | PERSONAL 210 | BUSINESS 220 | CREDIT 230 | MEDICAL 240 | ... | RESUME 250 |
|---|---|---|---|---|---|---|
| NAME 205 | YES | YES | YES | YES | ... | YES |
| ELECTRONIC SIGNATURE 215 | NO | NO | YES | NO | | NO |
| HOME ADDRESS 225 | YES | NO | YES | YES | | YES |
| UNLISTED HOME PHONE 235 | YES | NO | NO | NO | | YES |
| ... | ... | ... | ... | ... | | ... |
| CREDIT CARD NUMBER 245 | NO | NO | YES | NO | | NO |
| HOME PC / PASSWORD 255 | NO | NO | YES | NO | | YES |
| CREDIT SERVICE / SIGNATURE 265 | NO | NO | YES | NO | | NO |
| ... | ... | ... | ... | ... | | ... |

SECURE AND CONVENIENT INFORMATION STORAGE AND RETRIEVAL METHOD AND APPARATUS

BACKGROUND OF THE INVENTION

1. Field of the Invention

The present invention pertains to the field of information systems. More particularly, this invention relates to the art of selectively, securely, and conveniently disseminating information.

2. Background

Every time a person goes to the doctor, applies for a loan, or makes a credit card purchase over the telephone, the person is required to provide certain personal information. For instance, a doctor will likely ask if a patient has insurance and may inquire about the patient's medical history. A lending institution will likely require an applicant to provide any and all information related to the applicant's ability to make payments. Normally, providing the requested personal information involves completing at least one, and often several, forms, documents, and questionnaires either by hand or by verbally relaying the information. Even a relatively simple transaction like a credit card purchase over the telephone will likely require the purchaser to provide his or her name, address, and telephone number in addition to his or her credit card number.

In recent years, banks, telephone companies, and health care providers have started marketing "smart cards" in an attempt to improve security and accuracy as well as convenience. A smart card is generally a small electronic device about the size of a credit card that contains a re-writable memory and possibly additional integrated circuitry. Banks have typically marketed smart cards as secure cash replacements, wherein a user downloads a balance of money into the card's memory. The user can make purchases, from anyone who has a smart card reader, by debiting the balance stored in the card's memory. The card is more secure than cash because the cash balance cannot be accessed without providing a security code. When the balance runs low, the user has the option to download more money to the card.

Telephone smart cards work in a similar fashion. The card is credited with a certain dollar amount or telephone time. A smart card reader can be integrated into the telephone and the balance on the card can be debited for each call made.

In the health care industry, smart cards have been used to store the medical history of the card holder. For instance, a number of European socialized health care systems provide medical history smart cards. Using a smart card reader, a health care provider is able to read and add to a patient's medical history as the patient is being examined.

Smart cards have also been used to increase computer security. Generally, when a computer is remotely accessed over an insecure network, password keystrokes are vulnerable to detection. With a smart card, however, a computer password can be encrypted and stored in the card's memory. Then, from any remote terminal that has a smart card reader, access to a central computer can be established using an encrypted password.

Even with these innovations, the versatility of the smart card has yet to be fully realized. In the information age, protecting and selectively disseminating all types of information is of increasing importance. As information becomes more readily available, and more frequently required in order to carry on daily activities, convenient dissemination of information is also of increasing importance. Therefore, a need remains for a means to selectively, securely, and conveniently disseminate information.

SUMMARY OF THE INVENTION

A portable storage medium is used to store data and provide access to information from an information dissemination system (IDS). The storage medium can store one or more location/key pairs. Each of the location/key pairs designates a particular IDS location as well as an access key to the particular IDS location.

The storage medium can also store a plurality of information units. The information units are categorized into levels of information categories with at least one information category per level and at least one information unit per information category. Levels of information categories can be individually accessed and categories of information units within levels can be selectively downloaded.

BRIEF DESCRIPTION OF THE DRAWINGS

Examples of the present invention are illustrated in the accompanying drawings. The accompanying drawings, however, do not limit the scope of the present invention whatsoever. Like references in the drawings indicate similar elements.

FIG. 2 illustrates one embodiment of information categories and information units stored on a smart card;

DETAILED DESCRIPTION

In the following detailed description, numerous specific details are set forth in order to provide a thorough understanding of the present invention. However, it will be understood by those skilled in the art that the present invention may be practiced without these specific details and that the present invention may be practiced in a variety of alternate embodiments. In other instances well known methods, procedures, components, and circuits have not been described in detail.

Figure 1:
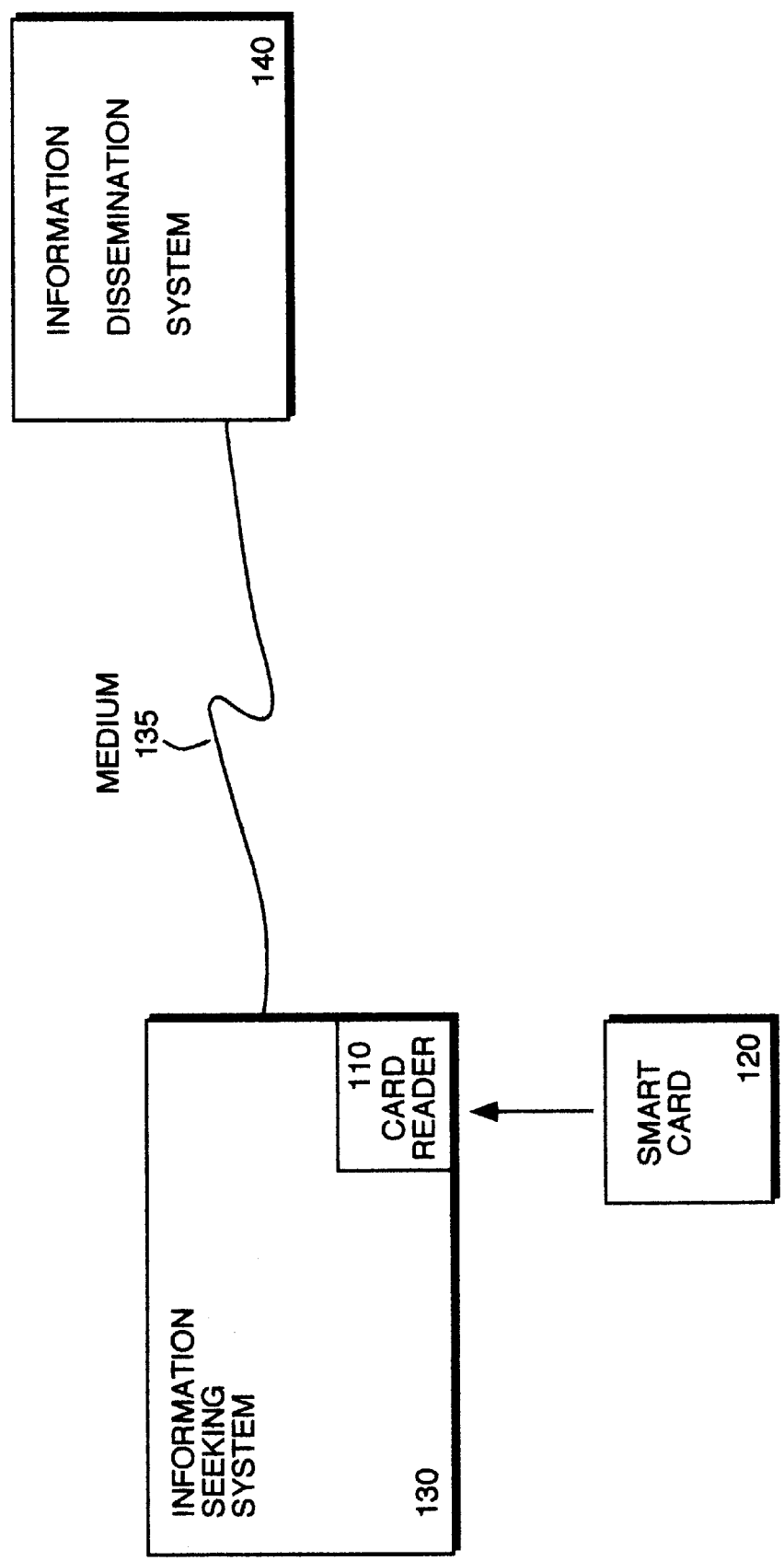
FIG. 1 illustrates one embodiment of an information dissemination system incorporating a smart card.

FIG. 1 illustrates one embodiment of an apparatus used to securely and conveniently disseminate selected information. The apparatus includes an information dissemination system (IDS) 140. IDS 140 represents a wide range of information disseminating systems, such as a web server on the internet or a local server in a local area network.

IDS 140 is coupled to an information seeking system (ISS) 130. ISS 130 can be used by any entity seeking to access information. ISS 130 represents a wide range of systems, including personal computers, cash registers, and public telephones. ISS 130 is coupled to card reader 110. In one embodiment, card reader 110 is integrated into ISS 130. Alternately, card reader 110 is external to ISS 130. In either case, card reader 110 is used to interface with smart card 120.

IDS 140 is coupled to ISS 130 through medium 135. Medium 135 is intended to represent a wide range of communications media, such as local area networks, public switched telephone networks (PSTN), and the internet.

In one embodiment, smart card 120 is about the size and shape of a regular credit card. Like a credit card, smart card 120 is easy to carry and convenient to use. Unlike a credit card, however, smart card 120 contains a storage medium (not shown), which can hold a variety of information, such as a user's name and address, a currency balance, and a telephone time balance. Among the items of information smart card 120 can store is a location/key pair. A location/key pair, as discussed in detail below, designates the location of IDS 140 and supplies the authentication information necessary to gain access to IDS 140.

Disseminating information is especially convenient using smart card 120. For instance, to apply for a bank loan, an applicant is normally required to manually complete a large number of loan documents. Assuming the bank has an ISS 130, however, a smart card user can download a subset of the requested information from smart card 120 directly to the bank. The card user can also grant the bank access to the remainder of the requested information using location/key pairs stored on smart card 120. For example, information downloaded directly from the card may include the applicant's name, address, employer, and a location/key pair. The location/key pair may designate the uniform resource locator (URL) of IDS 140 which is, for example, a web site operated by the card user's employer. The access key part of the location/key pair may provide a user identifier (ID) and a password to access the card user's employment file located at the web site. The bank's ISS 130 then has the option to go to the web site, provide the user ID and password, and verify the user's employment as well as download salary information.

In addition to convenience, smart card 120 also provides security. Access to the information stored on the card can be limited by any number of security measures. For example, smart card 120 could include security access logic (not shown) in addition to an encrypted personal identification number (PIN) and/or biometric code stored in the storage medium on the card using public key cryptography. Then, in order to access the card, a user would have to provide a PIN to ISS 130 and/or undergo a biometric scan or procedure such as a retina scan, a finger print scan, voice print recognition, or anatomy recognition such as face or hand recognition. ISS 130 would, in turn, provide the PIN or biometric data to the access logic on smart card 120 through card reader 110 for verification. The access logic would compare the provided PIN or biometric data to the encrypted PIN or biometric code and grant or deny access based on the comparison. No information, including the encrypted PIN or biometric code, would be read from smart card 120 until access was authorized.

Photo identification could provide additional security. The card could automatically download an image of the authorized user to ISS 130, after the PIN and/or biometric code has been verified. For instance, continuing the bank loan example from above, assuming the bank's ISS 130 includes a display device, ISS 130 could display the image of the authorized user for identification by bank personnel prior to allowing access to information stored on the card. That is, rather than depend on a photo physically affixed to the card where it is subject to tampering, an image could be encrypted and stored on the card in the storage medium.

Smart card 120 also allows a user to conveniently select the information to disseminate. For example, FIG. 2 shows one embodiment of how information can be stored and organized in smart card 120. As shown, a number of information units have been stored on the smart card. The information units include the user's name 205, electronic signature 215, home address 225, unlisted phone number 235, and credit card number 245, as well as two location key pairs 255 and 265. The card could also store the user's business address, other telephone numbers, additional credit card numbers, separate electronic signatures to authorize the use of credit cards and conduct other transactions, driver's license number, social security number, spouse's name, health insurance number and provider information, medical history, current cash balance, current balance of telephone time, one or more encrypted computer system remote passwords, and any other information the user may want to disseminate or access. The list of possibilities is virtually endless.

A number of information categories have also been stored on the smart card. As shown, the information categories include personal information 210, business information 220, credit information 230, medical information 240, and resume information 250. Additional categories could include consumer information, insurance information, family information, and any other category that a user may need to group information units together. Again, the possibilities are virtually limitless. Each information category links together one or more information units. A single information unit can be linked into multiple categories. For instance, the user's name 205 has been linked into all of the information categories shown in FIG. 2.

As an example, continuing the bank loan example from above, the loan applicant can select one or more information categories to download in addition to, or rather than, selecting individual information units. By selecting an information category, all the information units linked into the category are downloaded.

Information units can also be categorized into individually accessible levels of information categories and information units. Rather than granting access to all of the information on the card with one access code, a user can access different levels of information with different access codes. Access to a table of contents, like that shown in FIG. 2, may be obtained with one PIN. Then, access to highly sensitive information listed in the table may require additional access authority based on, for example, a retina scan. For instance, making a large purchase may require a finger print scan in addition to face recognition and a second PIN. A small purchase may only require face recognition. Similarly, downloading medical records may require voice print analysis. Individually accessible levels of information can be particularly useful where a card user hands his or her card over to, for example, a life insurance agent. The card user may not wish to disclose certain aspects of his or her medical history to the insurance agent but may want to keep the information available for his or her doctor. By protecting certain categories or sub-categories of information with a higher level of security, the card user can be assured that the insurance agent is not downloading sensitive information while the card is out of the user's hands.

Location/key pairs provide an additional degree of convenience, and greatly expand the amount of information a user can disseminate. A location/key pair can be linked into an information category just like any other information unit. Location/key pairs are particularly useful for disseminating information that changes frequently, is too voluminous to be stored on the card, or information that needs to be verified or authenticated by an independent source.

Figure 3:
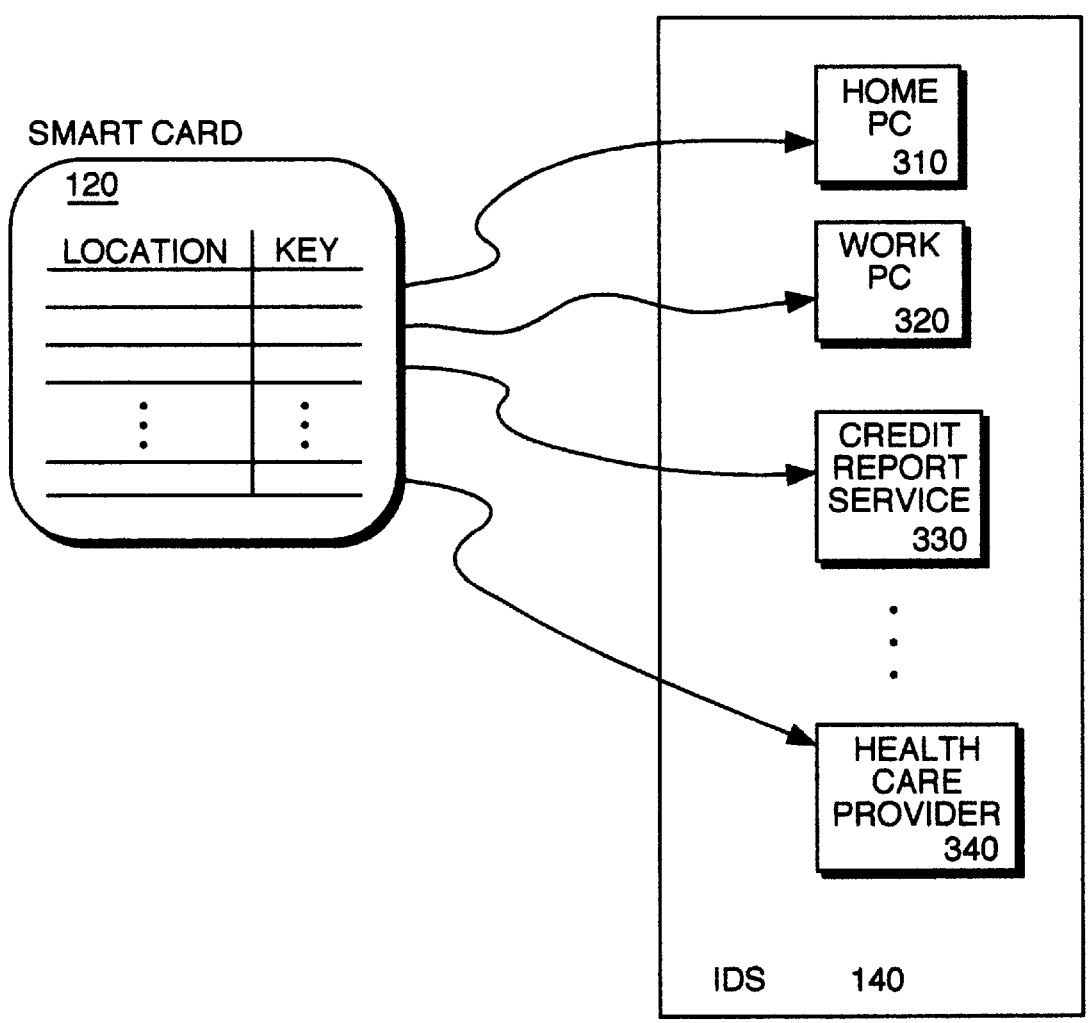
FIG. 3 illustrates one embodiment of a smart card storing a number of location/key pairs, each of which designate a particular network location.

FIG. 3 illustrates a number of location/key pairs stored on smart card 120. As shown, a number of IDS 140 locations are designated including the user's home personal computer 310, work computer 320, credit report service 330, and health care provider's computer 340. Additional locations could include former employers, previous landlords, educational institutions attended, and government agencies such as the Department Motor Vehicles and the Internal Revenue Service. The location can take many forms including a uniform resource locator (URL), an internet protocol (IP) address, or a direct dial telephone number. Various forms of information can be stored at each location such as a credit report, a medical archive, and tax records.

The form of the access key for each location depends on the desired level of security. For instance, if the designated location is the user's web page, access is likely to be open to the public and no access key will be needed. If, on the other hand, the designated location is the user's credit report service 330 or health care provider 340, an access key will likely be required. Where an access key is required, the entity seeking access must present the key at the designated location in order to gain access to the desired information. For example, the access key may be a user ID and accompanying password, a digital certificate or signature such as those used in public key cryptography, or any other information to establish access authority.

Access to information can be limited to a specific location and to the extent that the corresponding access key grants authority. For instance, a location may designate one specified directory or file on a particular hard drive. The rest of the hard drive can be protected by a fire wall. Within the specified location, an access key may grant one of many levels of access. For instance, a web site may have public areas and secure areas, or even levels of secure areas. Depending on the level of the access key used to enter the web site, different levels of information will be available.

Any number of access key security measures can be employed. For example, the access key could be encrypted so that it can only be used and not read or copied by the entity seeking access. The access key could also be time limited for use within a certain number of minutes or days after being downloaded, or it could be valid for only a limited number of accesses.

Using public key cryptography, for instance, an access key could be dynamically created or modified depending on who is the recipient of the key. When a location/key pair is downloaded, a user interface on ISS 130 could prompt the user to either use a default access key or define a unique access key. In which case, a user could selectively set a time-out parameter for the access key to be revoked after a particular amount of time. Dynamically created access keys can have additional uses, such as varying the number of authorized accesses or the level of access within a location.

Additional location/key pairs may be embedded within a location so that categories of information are connected in chains of locations. For instance, in the bank loan example from above, a location/key pair may provide access to a file on the user's home computer over a modem connection. The file may provide a list of former employers. The list could include embedded location/key pairs to grant access to employment records on each employers' computer system so that the entity accessing the list could authenticate the contents of the list The availability of embedded location/key pairs could also depend on the access key used to access the original location. For instance, as discussed above, a web site may have levels of secure areas. Depending on the level of the access key used to enter the web site, different choices of embedded location/key pairs may be available.

Figure 4:
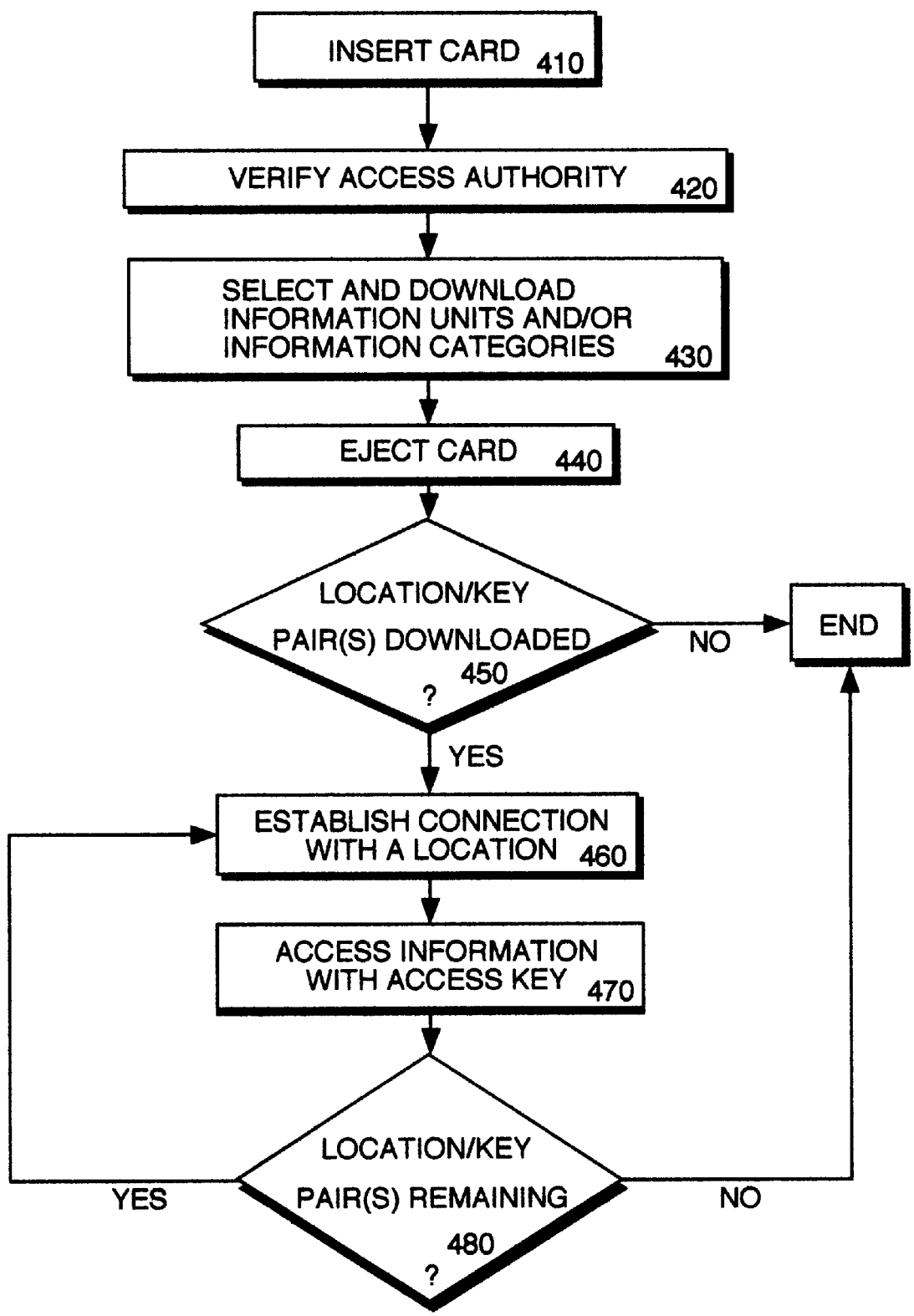
FIG. 4 illustrates the process of one embodiment of an information dissemination system incorporating a smart card.

FIG. 4 illustrates one embodiment of an information dissemination method using the apparatus of FIG. 1. First, smart card 120 is inserted into card reader 110 in block 410. Then, ISS 130 can interface with the card through card reader 110. In block 420, authority to access smart card 120 is verified. As discussed above, the card user may have to provide a PIN or undergo a biometric scan to gain access. Then, in block 430, the user can select categories of information units and/or individual information units to download to ISS 130. For instance, in one embodiment, ISS 130 includes a display device. A table, like that shown in FIG. 2, can be downloaded from smart card 120 to ISS 130 and displayed. Then, information can be selected, for example, using a pointing device like a mouse, a number pad, or voice input to designate the titles of information categories and information units.

Once the information is downloaded, smart card 120 is ejected from card reader 110 in block 440. If the downloaded information includes one or more location/key pairs, in block 450, ISS 130 has the option, in block 460, to establish a connection with the location of IDS 140. The location can then be accessed using the corresponding access key in block 470. In block 480, the process can be repeated until no location/key pairs remain.

Figure 5:
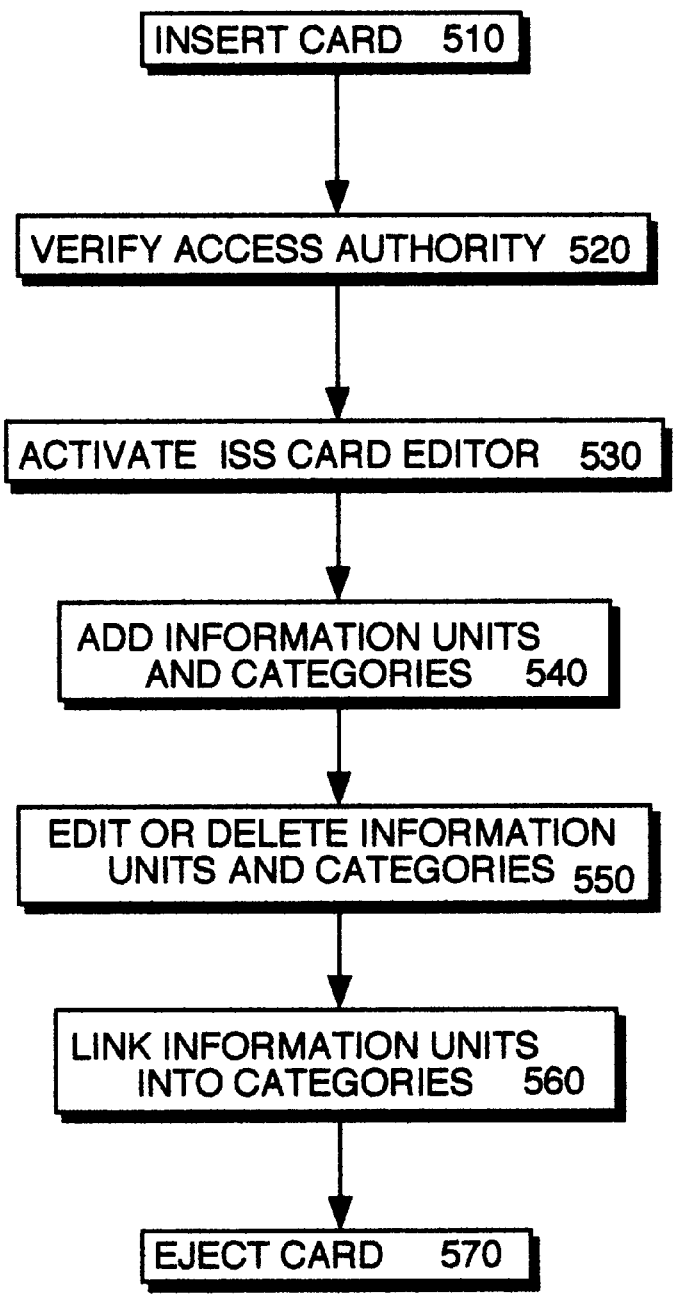
FIG. 5 illustrates one embodiment of a process to manage the contents of a smart card.

In addition to disseminating selected information, a smart card can be used and configured to store selected information. The storage medium on the card is re-writable so the card user can download information to the card, as well as delete, modify, and organize information stored on the card. FIG. 5 illustrates one embodiment of a process to perform these additional functions.

First, in block 510, the user inserts smart card 120 in card reader 110. After the user verifies access authority for the card in block 520, the user can activate a card editor process using ISS 130, in block 530. The card editor can be a software application stored on ISS 130 or on the card itself, or the card may include integrated circuitry to perform the card editor function, wherein the user interface is provided by ISS 130. In any case, with the card editor, the user can add new information categories and information units in block 540 by manually typing information with a text editor, or other application, and downloading it to the storage medium, by downloading information from a disk drive coupled to ISS 130, by downloading information from a location in IDS 140 through ISS 130, or by any other means. In one embodiment, for each item that is downloaded to the card, the user will be prompted for an identifying label. Each label will be added to the table shown in FIG. 2.

In block 550, the card editor can also be used to edit or delete information already stored on the card. In one embodiment, the table of FIG. 2 can be downloaded from the card to ISS 130, and individual information units and labels for information units and categories can be selected, downloaded to ISS 130, edited, and returned to the card. The card editor, in block 560, can then be used to organize the information by linking information units into information categories. For example, grid entries in FIG. 2 can be toggled yes/no in order to link an information unit into a category or remove it from a category. When the editing is complete, the card can be ejected in block 570.

Using the procedure of FIG. 5, a user may customize the card contents by creating variations on information units. For instance, a user may link an abbreviated or commonly used name into a personal or family information category, and link a full or formal name into a business or credit information category.

A user may also create information sub-categories, or variations on information categories. For instance, within a personal information category, a card user may distinguish among good friends and new acquaintances, wherein an unlisted home telephone number is linked into a good friend category but not into a new acquaintance category. Using sub-categories, different levels of categorized information can be selectively disseminated.

Any number of hardware systems can be used to perform the functions of ISS 130. For example, ISS 130 may be represented by a broad category of computer systems known in the art, such as a computer system equipped with a high performance microprocessor(s), such as the Pentium® processor, Pentium® Pro processor, or Pentium® II processor manufactured by and commonly available from Intel Corporation of Santa Clara, Calif., or the Alpha® processor manufactured by Digital Equipment Corporation of Maynard, Mass. Certain implementations such as cash registers and telephones may rely on processors with relatively low levels of functionality such as a digital signal processor (DSP).

Figure 6:
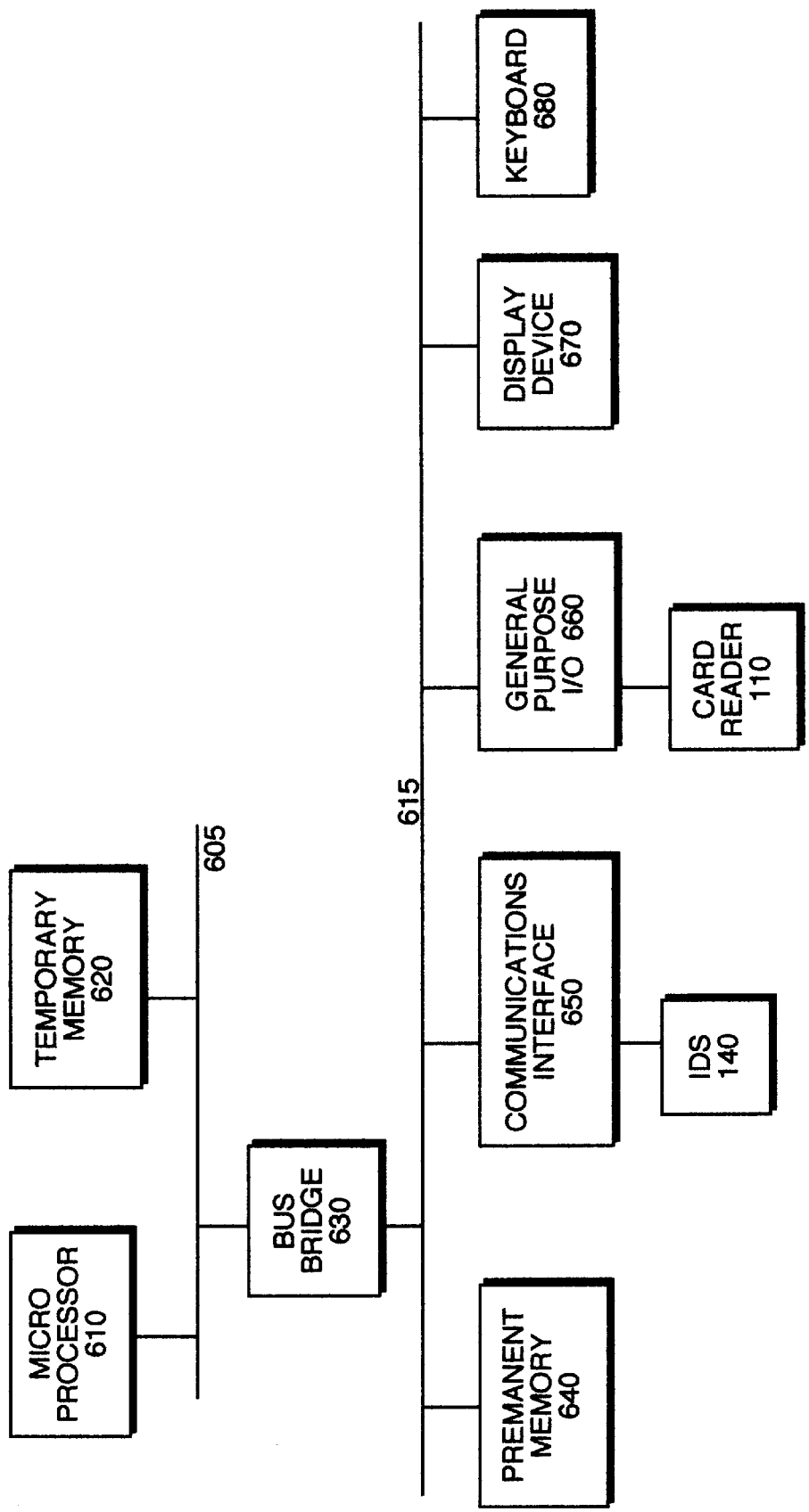
FIG. 6 illustrates one embodiment of a hardware system capable of performing the processes of FIGS. 4 and 5.

FIG. 6 illustrates one embodiment of a suitable hardware system. In the illustrated embodiment, the hardware system includes microprocessor 610 coupled to high speed bus 605, which is coupled to input/output (I/O) bus 615 through bus bridge 630. Temporary memory 620 is coupled to bus 605. Permanent memory 640 is coupled to bus 615. Display device 670 and keyboard 680 are also coupled to bus 615. Communications interface 650 and general purpose I/0 660 are also coupled to bus 615. Communications interface 650 couples the system to IDS 140, and general purpose I/0 660 couples the system to card reader 110.

Certain embodiments may include additional components, may not require all of the above components, or may combine one or more components. For instance, temporary memory 620 may be on-chip with microprocessor 610. Alternatively, permanent memory 640 may be eliminated and temporary memory 620 may be replaced with an electrically erasable programmable read only memory (EEPROM), wherein software routines are executed in place from the EEPROM. Likewise, keyboard 680 may be replaced with a simple number pad when, for instance, ISS 130 is integrated into a telephone. Some implementations may employ a single bus to which all of the components are coupled. Additional components may be included in the hardware system, such as additional processors, storage devices like a CD ROM, memories, and other peripheral components known in the art.

In one embodiment, ISS 130 as discussed above is implemented as a series of software routines run by the hardware system of FIG. 6. These software routines comprise a plurality or series of instructions to be executed by a microprocessor in a hardware system, such as microprocessor 610 of FIG. 6. Initially, the instructions can be stored on a storage device, such as permanent memory 640. It is to be appreciated that the instructions can be stored using any conventional storage medium, such as a diskette, CD-ROM, magnetic tape, digital video or versatile disk (DVD), laser disk, ROM, Flash memory, etc. It is also to be appreciated that the instructions need not be stored locally, and could be received from a remote storage device, such as a server on a network over communications interface 650, a CD ROM device, a floppy disk, etc. The instructions may be copied from the storage device into temporary memory 620 and then accessed and executed by microprocessor 610. In one implementation, these instructions are derived from software routines written in the C++ programming language. It is to be appreciated that these software routines may also be implemented in any of a wide variety of programming languages.

In alternate embodiments, the present invention is implemented in discrete hardware or firmware. For example, one or more application specific integrated circuits (ASICs) could be programmed with the above described functions of the present invention. In another example, ISS 130 could be implemented in one or more ASICs on an additional circuit board and the circuit board could be inserted into the hardware system of FIG. 6.

With any one of a number of hardware systems in place, smart card 120 can be customized to selectively, securely, and conveniently disseminate virtually any information in a wide variety of circumstances. In one embodiment, an information category may link names, addresses, and phone numbers of all the immediate family members, as well as provide a location/key pair designating a photo album archive on the user's home computer. In other embodiments, a user could download onto the card or provide a location/key pair to access an address book with a corresponding image archive. A job applicant could download a resume information category which includes a location/key pair designating the schools the applicant has attended, wherein a prospective employer can access the applicant's transcripts directly from the schools. At the doctor's office or the bank loan department, provided the doctor or bank have the necessary hardware, the user will never have to fill out another form. A car owner may create an automobile related category to conveniently and accurately provide his or her driver's license number and car insurance information when stopped by the police or after being involved in an automobile collision. A consumer may create fictitious information units, like a false address and telephone number, and link them into a consumer information category in order to avoid sales calls and junk mail in the future. Countless additional applications are possible.

A location/key pair may also include additional parameters. For instance, a location/key/info_type triple may indicate something about the type of information that is available at the given location using the given access key. In one example where the location identifies a school, the info_type parameter may indicate graduate transcripts. Additional parameter types include time stamps and access number indicators. Time stamps may indicate how old the information is at the given location or indicate how long the access key will be valid. Access number parameters may indicate how many times the given location can be accessed with the access key. A number of parameters can be included with each location/key pair, creating triples, quadruples, etc.

Certain locations may require multiple access keys like a safe deposit box in a bank. If ISS 130 does not have all of the keys necessary to access a given location, then ISS 130 cannot access it. For instance, access keys may be needed from both spouses in order to gain access to combined financial information. Medical test results stored on a hospital's computer may require the individual patient's access key as well as a general access key provided by the hospital. Dual or multiple access keys can be used anytime more than one party has an interest in maintaining the security of a given location.

Anywhere there is a card reader coupled to an ISS, individuals can transfer information or money from one entity to another or from one card to another card. Card readers and ISSs, therefore, can be integrated into public phones, cash registers, and computer terminals for easy access. Alternatively, card readers can utilize wireless communications. Then, as long as the card is in the general proximity of the card reader, information stored on the card can be accessed.

Proximity reading devices, such as wireless card readers, make a variety of storage medium configurations possible. For instance, storage mediums can be integrated into watches, jewelry, and clothing. A storage medium can even be surgically implanted within a user's body, thereby greatly increasing security and reducing the likelihood of the storage medium being lost In yet another embodiment, an ISS and card reader could be integrated into the smart card itself. For instance, a smart card could include a number pad and display screen, like a small calculator. Then, using wireless communications, information could be transferred from one card directly to another card.

The storage medium can be any of a number of non-volatile, re-writable information storage devices. For example, a flash electrically erasable programmable read only memory could be used. The storage device does not have to be electronic, though. For instance, magnetic memories, optical memories, and even biochemical memories could be used.

Thus, a method and apparatus for convenient, selective, and secure dissemination of information is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   accessing a machine-readable data structure stored on a smart card, said machine-readable data structure comprising a plurality of information units, each of said plurality of information units being associated with at least one of a plurality of information categories, said machine-readable data structure further comprising a directory of the plurality of information categories;
   satisfying a first level of security associated with the directory;
   retrieving the directory;
   selecting at least one of the information categories from the directory;
   satisfying a second level of security associated with selected information categories; and
   downloading information units associated with the selected information categories.

2. The method of claim 1 wherein the information units associated with the selected information categories comprise a location/key unit, said location/key unit to designate a location of an information dissemination system (IDS) and to provide an access key to the location, the method further comprising:
   establishing a connection with the location of the IDS; and
   accessing data stored at the IDS using the access key.

3. The method of claim 1 wherein satisfying the first level of security comprises at least one of:
   providing a personal identification number (PIN); and
   verifying a biometric code.

4. The method of claim 2 wherein the location/key unit further defines at least one of an information type for the data stored at the IDS and a time stamp.

5. The method of claim 2 wherein the IDS is provided by at least one of a user, an employer, a credit reporting service, a bank, a health care provider, an insurance carrier, a former employer, a government institution, and an education institution.

6. The method of claim 2 wherein the access key is at least one of revocable and dynamically generated.

7. The method of claim 2 wherein the location comprises at least one of a uniform resource locator (URL), an internet protocol (IP) address, and a telephone number.

8. The method of claim 1 wherein the information categories include at least one of personal information, business information, credit information, consumer information, medical information, insurance information, resume information, and family information.

9. The method of claim 1 wherein the information units include at least one of a user's name, electronic signature, address, telephone numbers, credit card numbers, driver license number, social security number, and health insurance information.

10. The method of claim 1 further comprising at least one of:
    storing additional information units to the portable storage medium;
    deleting particular information units from the portable storage medium;
    creating additional information categories;
    deleting particular information categories; and
    associating information units with information categories.

11. A machine readable storage medium having stored thereon machine executable instructions, wherein execution of said machine-executable instructions is to implement a method comprising:
    accessing a machine-readable data structure stored on a smart card, said machine-readable data structure comprising a plurality of information units, each of said plurality of information units being associated with at least one of a plurality of information categories, said machine-readable data structure further comprising a directory of the plurality of information categories;
    satisfying a first level of security associated with the directory;
    retrieving the directory;
    selecting at least one of the information categories from the directory;
    satisfying a second level of security associated with selected information categories; and
    downloading information units associated with the selected information categories.

12. An apparatus comprising:
    first logic to access a machine-readable data structure stored on a smart card, said machine-readable data structure comprising a plurality of information units, each of said plurality of information units being associated with at least one of a plurality of information categories, said machine-readable data structure further comprising a directory of the plurality of information categories;
    second logic to satisfy a first level of security associated with the directory;

third logic to retrieve the directory;

fourth logic to select at least one of the information categories from the directory;

fifth logic to satisfy a second level of security associated with selected information categories; and sixth logic to download information units associated with the selected information categories.

13. An apparatus comprising:

a smart card to store a machine-readable data structure, said machine-readable data structure comprising a plurality of information units, each of said plurality of information units being associated with at least one of a plurality of information categories, said machine-readable data structure further comprising a directory of the plurality of information categories; and said smart card to store machine-executable instructions, wherein execution of said machine executable instructions is to implement a method comprising initiating a first level of security associated with the directory;

providing the directory if the first level of security is satisfied;

receiving a selection of at least one of the information categories from the directory;

initiating a second level of security associated with selected information categories; and providing information units associated with the selected information categories if the second level of security is satisfied.

* * * * *